UNITED STATES PATENT OFFICE.

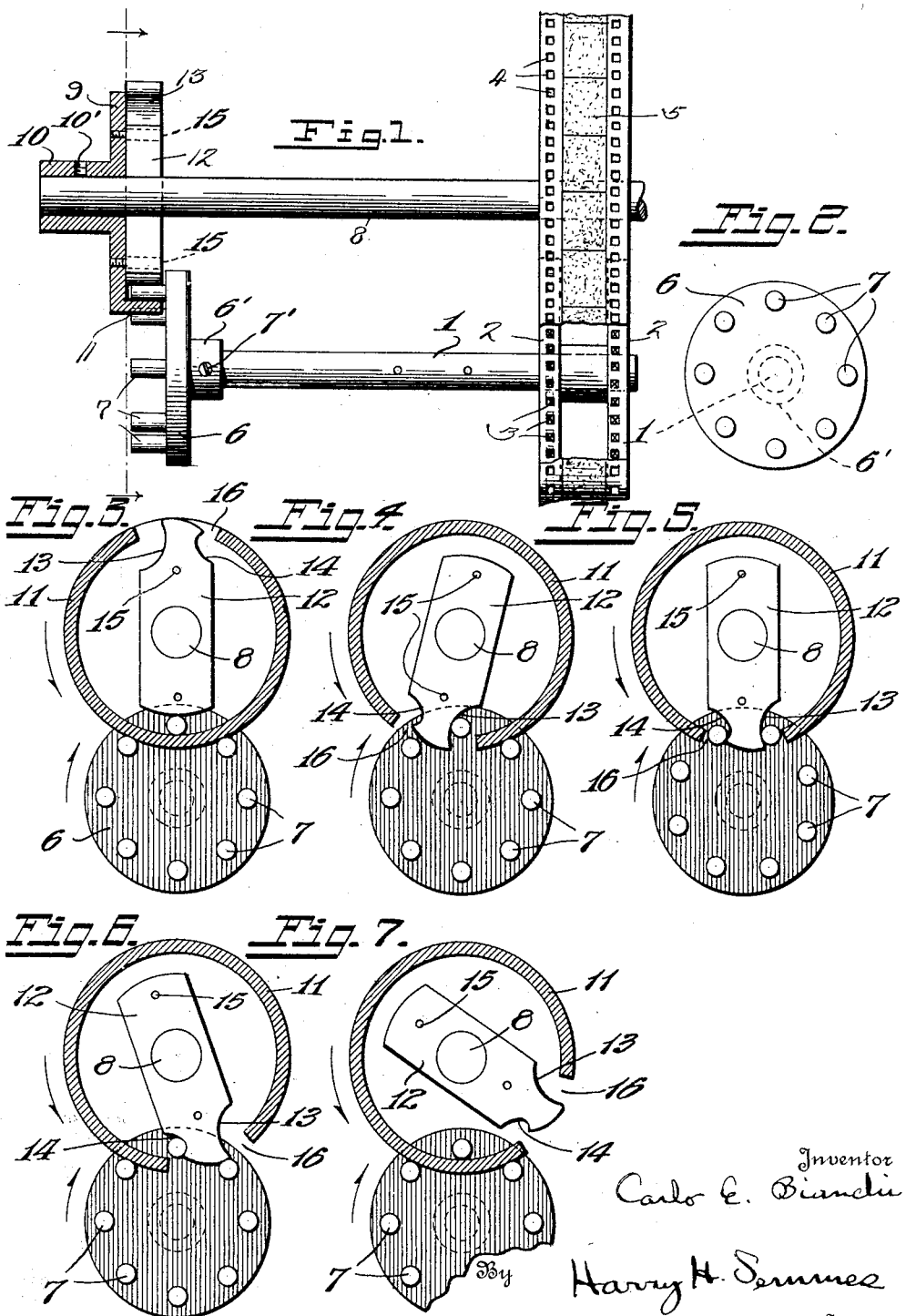

CARLO E. BIANCHI, OF MONTPELIER, VERMONT.

INTERMITTENT-MOTION MECHANISM.

1,396,002.  Specification of Letters Patent.  Patented Nov. 1, 1921.

Application filed April 5, 1920. Serial No. 371,337.

*To all whom it may concern:*

Be it known that I, CARLO E. BIANCHI, a citizen of the United States, residing at Montpelier, in the county of Washington and State of Vermont, have invented certain new and useful Improvements in Intermittent-Motion Mechanism, of which the following is a specification.

My invention relates to motion picture machines and to means for operating the film to impart to it the necessary intermittent motion indispensible in the reproduction of motion pictures.

More particularly, my invention relates to an apparatus for correctly and positively insuring the intermittent progression of the film so that the change from one picture to the next takes place quickly but without undue strain on the film or vibration of the machine.

Heretofore, considerable difficulty has been experienced by reason of injury or tearing of the film because of the jerking strains to which it was subjected. The intermittent motion given to the film occurred at such a high rate of acceleration that by reason of the inertia of the film it was subjected to great stretching forces that quickly caused its deterioration. Another fault that had been found with the customary types of apparatus producing intermittent motion lay in the fact that when the machine had been used for a certain length of time, unsteadiness or flickering occurred in the reproduction of the pictures. This unsteadiness or flickering was caused by the wearing of the parts which hold the intermittent motion mechanism at the position of rest during the fraction of a second that the film does not move. As the machine was used for a length of time, the contact between the parts which arrested the motion of the mechanism became worn and this allowed a certain amount of play, which in turn produced flickering in the reproduction of the pictures.

An object of my invention is to shift the film from one position to the succeeding position by means of a mechanism which imparts to the film a gradually increasing velocity.

Another object of my invention is to provide a mechanism which will withstand long use, and in which the parts subjected to wear are so arranged that there will no undue play between them even after an extended use of the machine.

With these and other objects in view which are incident to the improvements, my invention consists in the parts and combinations to be hereinafter set forth and claimed, with the understanding that the several necessary elements comprising my invention may be varied in proportion and arrangement without departing from the spirit and scope of the appended claims.

In order to make my invention more clearly understood, I have shown in the accompanying drawings means for carrying it into practical effect, without limiting the improvements in their useful application to the particular construction, which for the purpose of explanation have been made the subject of illustration.

Figure 1 is a side elevation partially in cross-section showing my intermittent motion mechanism applied to a motion picture film.

Fig. 2 is an end elevation of the rotating member,

Figs. 3, 4, 5, 6 and 7 are diagrammatic views of the intermittent motion mechanism illustrating its operation.

Referring to Fig. 1, there is shown a shaft 1 to which are keyed rotary members 2, having mounted upon their peripheries suitable teeth 3 for engagement with slots 4, located equidistantly along the edge of a motion picture film 5, whereby the film may be made to move in accordance with the rotation of the rotary members 2. Mounted upon shaft 1 is a disk 6 having a collar 6', fitting over the end of the shaft 1, and a screw 7' to couple the disk 6 and its collar 6' immovably to shaft 1. Upon the disk 6 are located equidistantly upon the circumference of a common circle lugs 7.

Parallel to the shaft 1 is a shaft 8 having a revolving disk 9 which carries an annular flange 11 and a collar 10, through which the end of the shaft 8 fits. The collar 10 and the disk 9 with its annular flange 11 is keyed to the shaft 8 by means of screw 10'. A cam member 12 through which the shaft 8 passes is provided at one end with a cam face 13 and a cutaway portion 14. The cam member 12 is suitably fastened to the disk 9 by bolts 15 or any other convenient means.

Suitable power having been applied to shaft 8, from a source not shown, causes it to rotate in a counter clockwise direction, the parts being in the position shown in Fig. 1. At this position of the parts, cam surface 13 strikes against one of the lugs 7 of the disk 6. The cam surface 13 is so constructed that the motion imparted to the disk 6 will have a gradually increasing velocity imparted to it rather than a sudden jerk. The parts then take a position similar to that shown in Fig. 5 in which one of the lugs 7 in front of the cam surface is due to pass out through the aperture 16, while the succeeding lug is about to pass between the other edge of the aperture 16 and the cut-away portion 14 of the cam member 12. Fig. 6 shows the next succeeding position in which one of the lugs 7 passes out completely from the aperture 16 and is just leaving the cam surface 13. While this is occurring the succeeding lug 7 has passed upward along the cutaway portion 14 and is about to enter the interior of the annular flange 11. Fig. 7 shows the position of the parts during the period in which the picture is held immovable. It will be noted that the lug 7 within the interior of the annular flange 11 will remain immovable until a complete rotation of the shaft 8 has been accomplished, at which time the cam surface 13 will strike it and force it out from the aperture 16, at the same time another lug is caused to pass through the other side of the aperture 16 and by the cutaway portion 14 of the cam member 12. By reason of the large surface of the annular flange 11 which is adjusted to bear with light contact upon the two lugs 7 immediately exterior thereof as illustrated in Figs. 3 and 7, there will be but slight wear upon any particular point of the surface and so the play between the flange 11 and the two contacting lugs will be but small even after extended use of the machine. This operates to insure lack of flickering and clear reproduction of the pictures after the machine has been subjected to a long period of use.

What I claim is:

1. An intermittent movement mechanism comprising a rotating member, lugs on the rotating member, an annular member, a cam having a cam face and a cut-away portion adapted to operate through an opening in the annular member so that the lug entering the annular member is in engagement with the cut-away portion and the lug leaving the annular member is in engagement with the cam until the entering lug lies in a plane common with the axes of the rotating member and annular member.

2. An intermittent movement mechanism comprising a shaft, an annular member on the shaft, a rotating member, lugs on the rotating member, a cam on the shaft having a cam face and a cutaway portion adapted to operate through an opening in the annular member so that the lug entering the annular member is in engagement with the cut-away portion and the lug leaving the annular member is in engagement with the cam until the entering lug lies in a plane common with the axes of the rotating member and annular member.

3. An intermittent movement mechanism comprising a shaft, an annular member on the shaft, a cam on said shaft adapted to operate through an opening in the annular member and having a cam face and a cut-away portion, a rotating member, lugs on the rotating member equally spaced on the periphery of a common circle and coöperating with the cam to give an intermittent motion to the rotating member, whereby the lug entering the annular member is in engagement with the cut-away portion of the cam and the lug leaving the annular member is in engagement with the cam until the entering lug lies in a plane common with the axes of the rotating member and annular member.

In testimony whereof I affix my signature.

CARLO E. BIANCHI.